United States Patent [19]

Kaku et al.

[11] Patent Number: 5,094,217

[45] Date of Patent: Mar. 10, 1992

[54] AIR FUEL INJECTION SYSTEM

[75] Inventors: Junichi Kaku; Takahiro Suzuki, both of Iwata, Japan

[73] Assignee: Yamaha Hatsudoki Kabushiki Kaisha, Iwata, Japan

[21] Appl. No.: 608,682

[22] Filed: Nov. 2, 1990

[30] Foreign Application Priority Data

Nov. 2, 1989 [JP] Japan .................. 1-286751

[51] Int. Cl.⁵ .................................. F02M 67/02
[52] U.S. Cl. .......................... 123/533; 123/41.31; 123/41.32; 123/198 E
[58] Field of Search ............. 123/533, 531, 41.31, 123/41.32, 198 E

[56] References Cited

U.S. PATENT DOCUMENTS

| | | | |
|---|---|---|---|
| 1,449,086 | 3/1923 | Brooke | 123/533 |
| 2,305,891 | 12/1942 | Neuland | 123/41.31 |
| 3,090,463 | 5/1963 | Yanda | 123/198 E |
| 3,669,082 | 6/1972 | Hatz | 123/41.31 |
| 3,941,115 | 3/1976 | Tshida et al. | 123/198 E |
| 4,071,009 | 1/1978 | Kraina | 123/198 E |
| 4,141,334 | 2/1979 | Hatz | 123/198 E |
| 4,800,862 | 1/1989 | McKay et al. | 123/531 |

FOREIGN PATENT DOCUMENTS 53-11248  2/1978  Japan .................. 123/198 E

Primary Examiner—Andrew M. Dolinar
Attorney, Agent, or Firm—Ernest A. Beutler

[57] ABSTRACT

An air fuel injector system for a two cycle crankcase compression internal combustion engine, including an insulating housing encircling and enclosing at least a portion of the air fuel injectors for sound deadening. In addition, air is circulated through this housing to cool the injectors. The circulated air is air that is bypassed from an air compressor to maintain regulated pressure for the air fuel injectors.

14 Claims, 6 Drawing Sheets

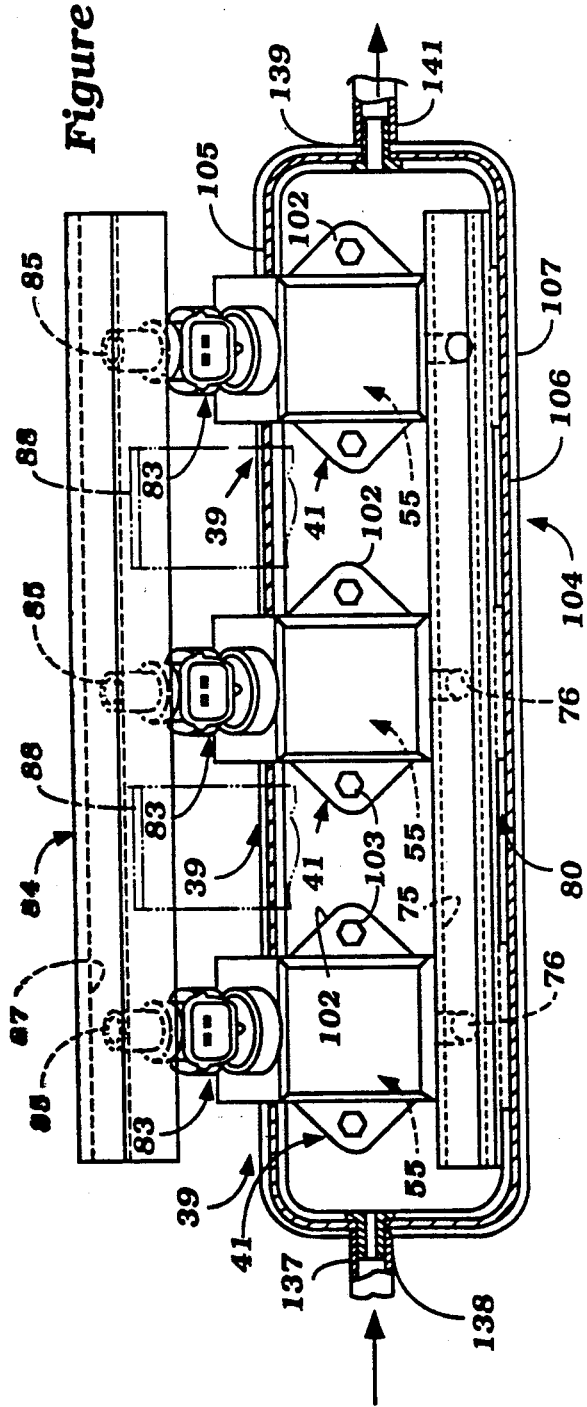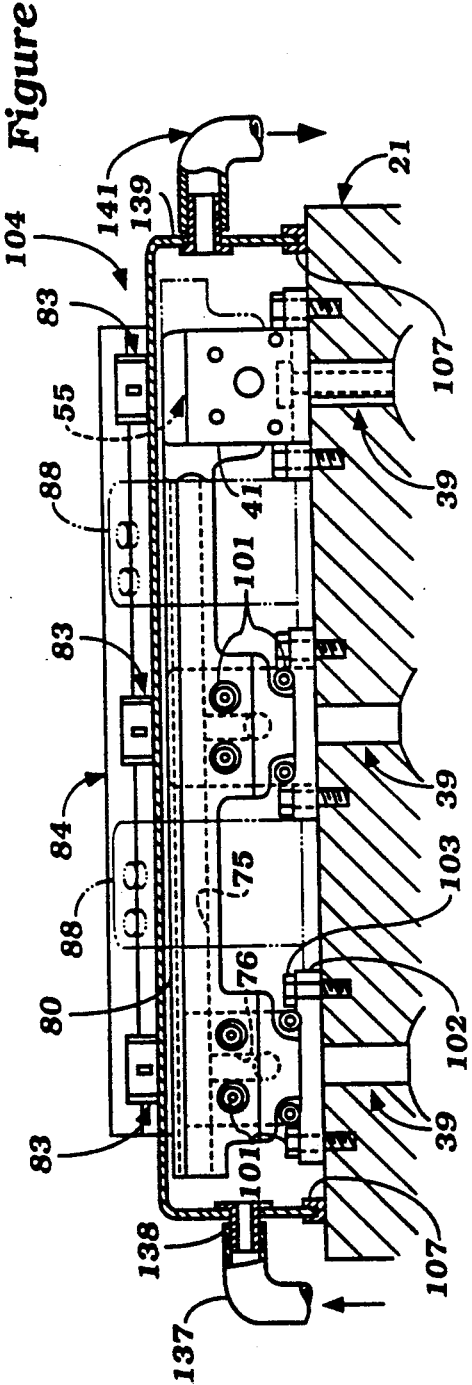

AIR FUEL INJECTION SYSTEM

BACKGROUND OF THE INVENTION

This invention relates to an air fuel injection system and more particularly to an improved silencing and cooling arrangement for an air fuel injector unit.

The advantages of providing an air and fuel injector for internal combustion engines, particularly those operating on the two cycle crankcase compression principle, are well known. In accordance with such injectors, the injection unit normally includes a housing having a nozzle port and an injection valve which opens and closes the nozzle port and controls the ignition of both fuel and air under pressure to the combustion chamber of the engine. The injection valve may be operated in one of a wide variety of manners and frequently an electrical solenoid is employed for opening and closing the injection valve. Of course, the use of such valve actuators and the opening and closing of the valve can generate noise which may be objectionable.

It is, therefore, a principal object of this invention to provide an improved air fuel injector unit having a silencing arrangement.

It is further object of this invention to provide an arrangement for silencing the valve actuator of a fuel air injector unit.

In addition to the noise problem, the use of an electrical solenoid for operating the injection valve can give rise to other objectionable characteristics. That is, the electrical actuator will generate some heat and this heat can be passed on to both the fuel and air injector and can decrease the efficiency of the engine.

It is, therefore, a still further object of this invention to provide an improved fuel air injector and an arrangement for cooling it.

It is a further object of this invention to provide a cooling arrangement for a fuel air injector wherein the compressed air supplied to the injector is also used as an arrangement for cooling the injector.

SUMMARY OF THE INVENTION

A first feature of this invention is adapted to be embodied in a fuel air injection unit for injecting fuel and air to an internal combustion engine and comprises a housing assembly having an injector port and an injection valve supported for movement between an open position and a closed position for controlling the flow through the injector port. An actuator is provided for the injection valve for operating the injection valve between its positions. A fuel injector is mounted in the housing assembly for injecting fuel thereto for discharge when the injection valve is in its opened position. An air inlet port is also provided in the housing assembly for receiving compressed air for discharge from the injection port when the injection valve is opened. In accordance with a first feature of the invention, a sound insulating housing at least in part encloses the housing assembly.

In accordance with another feature of the invention, cooling air is circulated through the housing assembly for cooling the enclosed portion of the injector unit.

BRIEF DESCRIPTION OF THE DRAWINGS

FIG. 4 is a top plan view of the fuel injector assemblies with a portion broken away.

FIG. 5 is a side elevational view of the fuel injection assemblies looking from the side to which the air manifold is affixed with a portion broken away.

DETAILED DESCRIPTION OF THE PREFERRED EMBODIMENT

Figure 1:
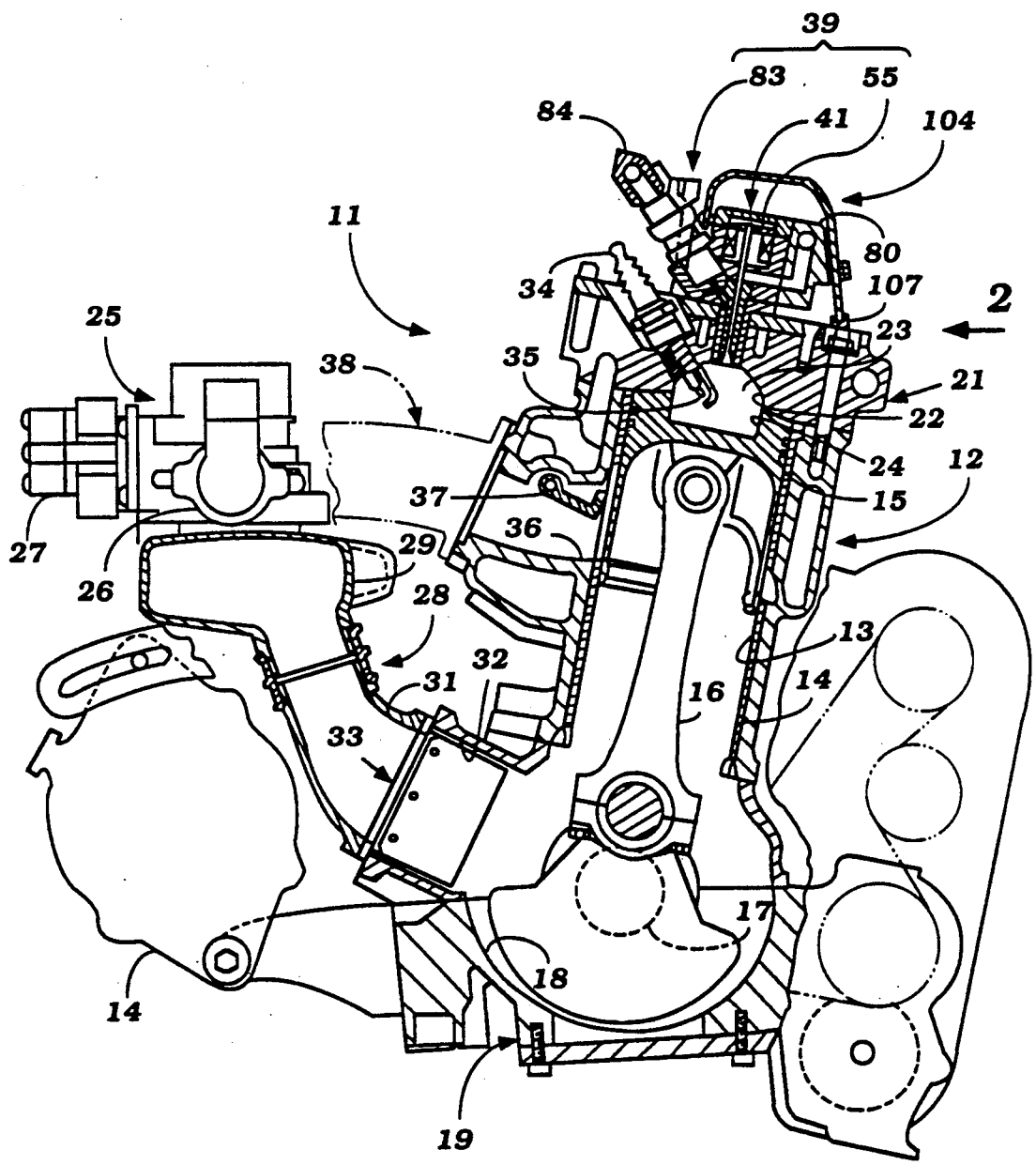
FIG. 1 is a cross sectional view taken through one cylinder of a multiple cylinder, two cycle, crankcase compression engine constructed in accordance with an embodiment of the invention with another embodiment shown in phantom lines.
Figure 2:
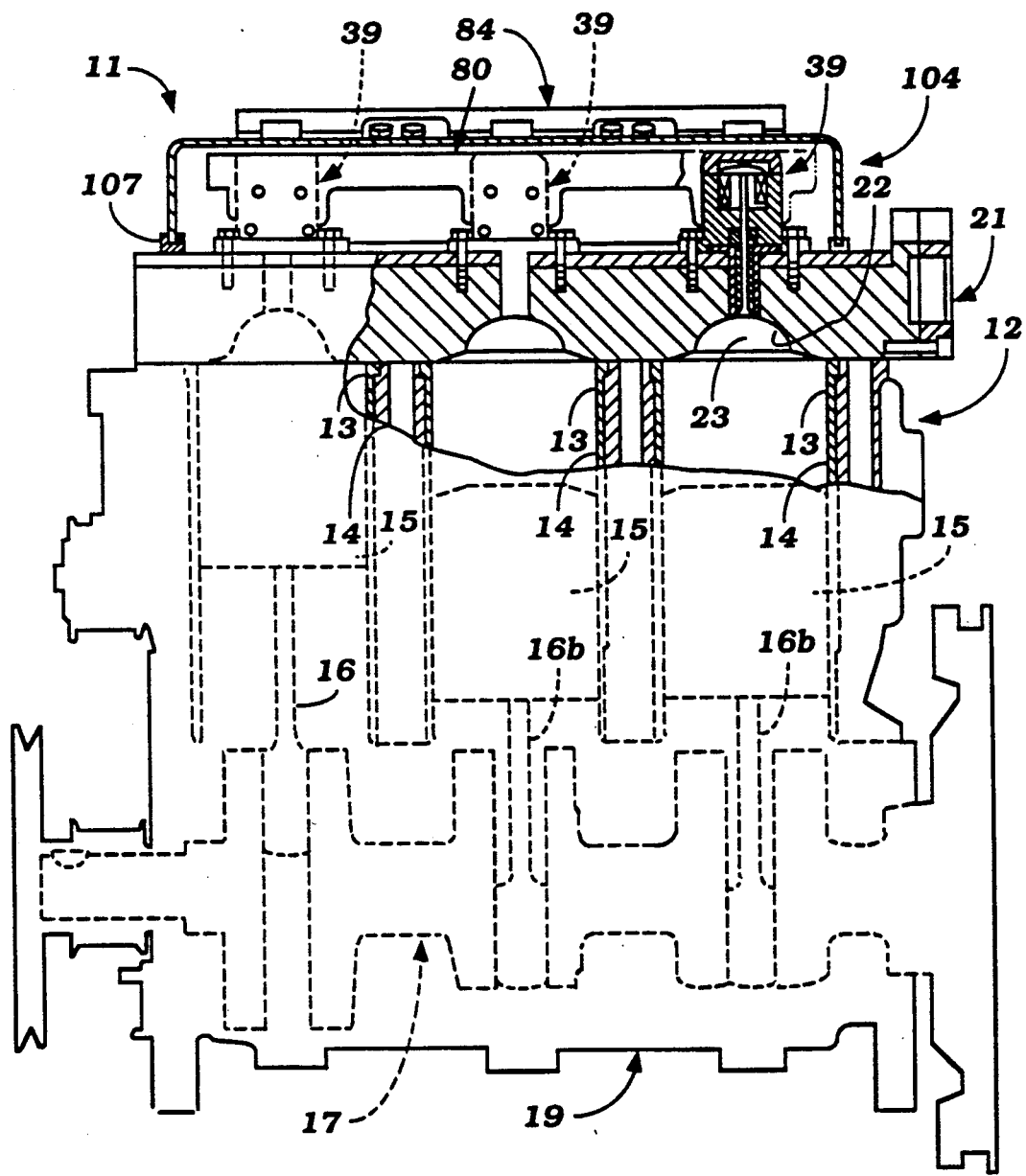
FIG. 2 is a side elevational view, with portions broken away, of the engine and looking generally in the direction of the arrow 2 in FIG. 1.

Referring now in detail to the drawings and initially primarily to FIGS. 1 and 2, a three cylinder, in line, two cycle, crankcase compression, internal combustion engine constructed in accordance with an embodiment of the invention is identified generally by the reference numeral 11. The engine 11 is, as noted, illustrated to be a three cylinder, in line type engine. It is to be understood, however, that the invention may be also employed in conjunction with engines having other numbers of cylinders and other cylinder orientations. In fact, certain features of the invention can be utilized in conjunction with rotary rather than reciprocating type engines and, in addition, some features of the invention may also be employed in engines operating on the four stroke rather than two stroke principle. The invention, however, has particular utility in conjunction with two stroke engines.

The engine 11 is comprised of a cylinder block assembly, indicated generally by the reference numeral 12, in which three aligned cylinder bores 13 are formed by cylinder liner 14 that are received within the cylinder block 12 in a known manner. Pistons 15 are supported for reciprocation within each of the cylinder bores 14 and are connected by means of respective connecting rods 16 to a crankshaft 17 that is journaled for rotation within a crankcase chamber 18 formed by the cylinder block 12 and a crankcase 19 in a known manner.

A cylinder head assembly 21 is affixed to the cylinder block 12 and has individual recesses 22 which cooperate with the piston 15 and cylinder bore 13 to form combustion chambers 23. The heads of the pistons 15 are provided with bowls 24 so as to further form these combustion chambers 23.

An air charge is delivered to the crankcase chambers 18 associated with each of the cylinder bores 13 by an induction system that includes a throttle body, indicated generally by the reference numeral 25, that receives air from an air cleaner (not shown). This throttle body 25 includes a throttle valve (not shown) which is manually operated and the position of which is sensed by a potentiometer 26 to provide a throttle valve position signal for controlling the fuel injection system to be described. In addition, a sub injector 27 may be provided in the throttle body 25 so as to inject additional fuel under certain running conditions.

The throttle body 25 delivers the air to an induction system, indicated generally by the reference numeral 28, and which includes a plenum chamber 29. The plenum chamber supplies air through manifolds 31 to inlet ports 32 associated with each crankcase chamber 18. These crankcase chambers 18 are sealed from each other, as is typical with two cycle engine practice. A reed type check valve 33 is positioned in each inlet port 32 so as to prevent reverse flow when the charge is being compressed in the crankcase chambers 18 by downward movement of the pistons 15.

The compressed charge is transferred to the combustion chambers 23 through suitable scavenge passages (not shown). This charge is then further compressed in the combustion chambers 23 by the upward movement of the pistons 15 and is fired by a spark plug 34 mounted in the cylinder head 21 with its gap 35 extending into the combustion chamber 23.

The burnt charge is then discharged from the combustion chambers 23 through exhaust ports 36 in which exhaust control valves 37 are provided. The exhaust control valves 37 are operated so as to provide a reduced compression ratio under high speed, high load operating conditions in a suitable manner. The exhaust gases are then discharged to the atmosphere through an exhaust system which includes an exhaust manifold 38.

The fuel charge for the combustion and an additional air charge is supplied by injector units 39 which are shown in most detail in the remaining figures and will now be described by reference additional to these remaining figures.

Figure 3:
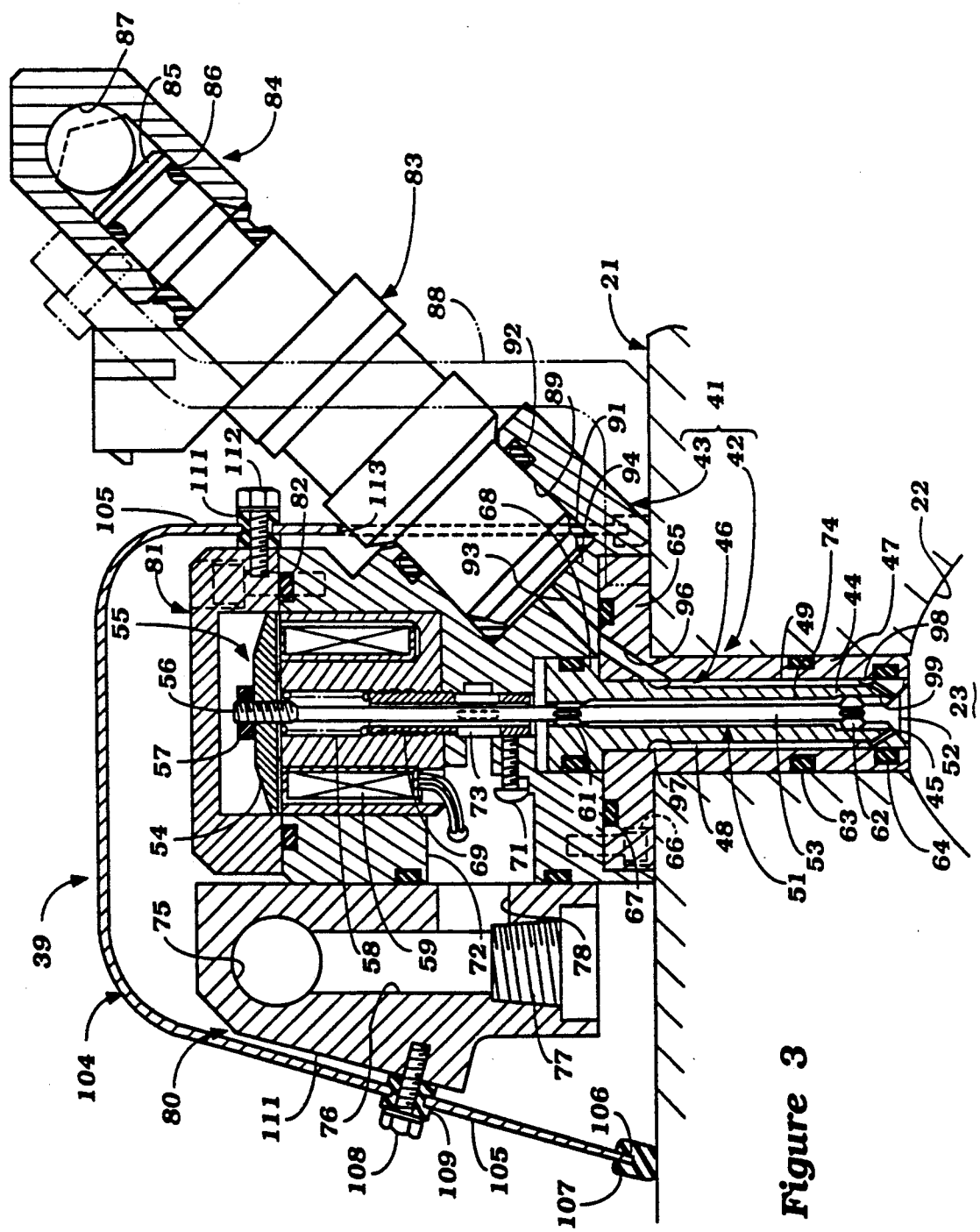
FIG. 3 is a cross sectional view taken through one of the injectors on the same plane as FIG. 1 but looking in the opposite direction.

The injectors 39 include a housing assembly (FIG. 3), indicated generally by the reference numeral 41, which is comprised of a lower housing piece 42 and an upper housing piece 43. The lower housing piece 42 has a cylindrical portion 44 that is received within a suitable bore formed in the cylinder head and terminates at a nozzle portion 45. The nozzle portion 45 is formed by an insert, indicated generally by the reference numeral 46, which has a cylindrical portion 47 that is disposed radially inwardly of a bore 48 formed in the cylindrical portion 44 of the lower housing portion piece 42. This forms a chamber 49 to which fuel is delivered, in a manner to be described. The nozzle opening 45 is formed by an enlarged diameter portion of the insert 46.

An injection valve, indicated generally by the reference numeral 51, has a head portion 52 that cooperates with the nozzle seat 45 so as to open and close it. The injection valve 51 has a reduced diameter portion 53 that extends through a bore in the insert piece 46 and which is connected at its upper end to an armature plate 54 of a solenoid assembly, indicated generally by the reference numeral 55. The upper end of the valve stem 53 is threaded as at 56 so as to receive a nut 57 to provide an adjustable connection to the armature plate 54.

A coil compression spring 58 acts against the armature plate 54 and urges the injection valve 51 to its normal closed position as shown in the figures of the drawings. A solenoid winding 59 encircles the upper end of the valve stem 53 and when energized will attract the armature plate 54 downwardly to compress the spring 58 and open the injection valve 51.

The valve stem 51 is provided with upper and lower extension lugs 61 and 62 that slidably engage the bore in the insert piece 46 so as to support the valve 51 for its reciprocal movement without interfering with the air flow therepast.

The cylindrical portion 44 of the housing piece 42 is formed with one or more annular grooves in which an O ring seal 63 is provided for sealing with the cylinder head. In a like manner, its internal surface is formed with an annular groove so as to receive an O ring seal 64 which seals with the enlarged end of the insert 46.

The housing piece 42 has an enlarged flange 65 formed at its upper end which is received within a counterbore formed in the lower, face of the housing piece 43. Socket headed screws 66 affixed the housing pieces 42 and 43 to each other and an O ring seal 67 provides a seal between these pieces. The insert piece 46 has an enlarged headed portion 68 that is received within a bore formed in the housing piece 43 at the base of the counterbore which receives the flange 65 of the housing piece 42. Above this bore, the housing piece 43 is provided with a further bore that receives a sleeve 69 that is threaded to the core of the solenoid winding 59 and against which the coil compression spring 58 bears. This sleeve 69 provides a combined mounting function for the winding 59 and preload adjustment for the spring 58. The sleeve 69 is held in position by means of a lock screw 71 which is threaded through the housing piece 43 and which is accessible through an opening 72 formed in the side thereof. The opening 72 also admits air, in a manner to be described, which can flow through a slotted opening 73 in the sleeve 69 so as to be received in a gap 74 formed around the valve stem 53 and the interior of the insert piece 46.

The air is delivered to the opening 72 from an air manifold, indicated generally by the reference numeral 80, and which is affixed to the injector bodies in a manner to be described. The air manifold 80 has a transversely extending passage 75, one end of which is connected to a regulated source of air pressure (to be described). The bore 75 is intersected by crossbores 76, the outer ends of which are closed by plugs 77. The manifold 80 is further provided with intersecting passages 78 which communicate with the openings 72 in the housing piece 43 so as to permit air under pressure to enter the aforenoted chamber 74.

Air leakage from around the solenoid 55 is precluded by means of a cap 81 that is affixed to the upper end of the housing piece 43 and which engages an 0 ring seal 82.

A fuel injector 83 is provided for each of the injectors 39. The fuel injectors 83 may be of any known type. Fuel is delivered to all of the fuel injectors 83 by a fuel manifold 84 that is affixed to the tips 85 of the fuel injectors 83 and which are sealed thereto by 0 ring seals 86. A manifold line 87 which communicates with a regulated pressure fuel source (to be described) delivers the fuel to the fuel injectors 83. The fuel manifold 84 is mounted on a mounting bracket that is shown in phantom in FIG. 3 and which is identified by the reference numeral 88.

For ease of location, the housing piece 43 is formed with a bore 89 that is disposed at approximately a 45 degree angle to the axis of the injector valve 51. These bores 89 receive the nozzle portions of the injectors 83. O ring seals 91 and 92 provide a sealing function around these nozzle portions so that the fuel which issues from the injectors 83 will be directed toward a passage 93 bored into the housing piece 43. These passages extend from the bores 89 and specifically from shoulders 94 formed at the base of these bores 89. The fuel injector nozzle end portions 95 are spaced slightly from the end walls 94 so as to provide a chamber through which the fuel will be injected. By using this close spacing, no significant dead space exits between the injector nozzle and the passage 93. Dead space will be eliminated and better fuel injection control can be obtained.

The housing piece passage 93 is intersected by corresponding passage 96 formed in the housing piece 42. These passages terminate in an annular recess 97 formed in the periphery of the insert 46 so as to communicate the fuel with the chamber 49. At the lower end of the chamber 49, there is provide another annular relief 98 that is intersected by a plurality of ports 99 that extend through the lower end of the enlargement of the insert piece 46 at the valve seat 45. Hence, when the valve head 52 moves to its open position, both fuel and air will be valved into the combustion chambers 23.

It has been previously noted that the air manifold 80 has been affixed to each of the injectors 39. As may be best seen in FIG. 5, this is achieved by a plurality of socket headed screws 101. By forming the air manifold from a relative rigid material such as aluminum extrusion, an aluminum die casting or rigid plastic, enough rigidity can be added to the system so that all of the injectors 39 and air manifold 80 can be removed from the engine as a unit.

The assembly is mounted to the engine by means of mounting lugs 102 formed on the injector housing portions 43 through which threaded fasteners 103 extend. Hence, the unitary assembly consisting of the individual injector nozzles 39 and air manifold 80 can be removed from the engine easily by removing the socket headed screws 83 and the entire assembly. This obviously facilitates servicing.

It should be readily apparent that the opening and closing of the injector valves 51 by actuation of the solenoid 55 and movement of the armature plate 54 will generate some noise. In addition, the alternate energization of the solenoid windings 59 will also cause certain heat to be generated. In order to dampen this noise and to cool the injectors 39, there is provided a sound insulating cover assembly, indicated generally by the reference numeral 104 which is a generally dome shaped member and which may be formed from sheet metal or the like.

Figure 7:
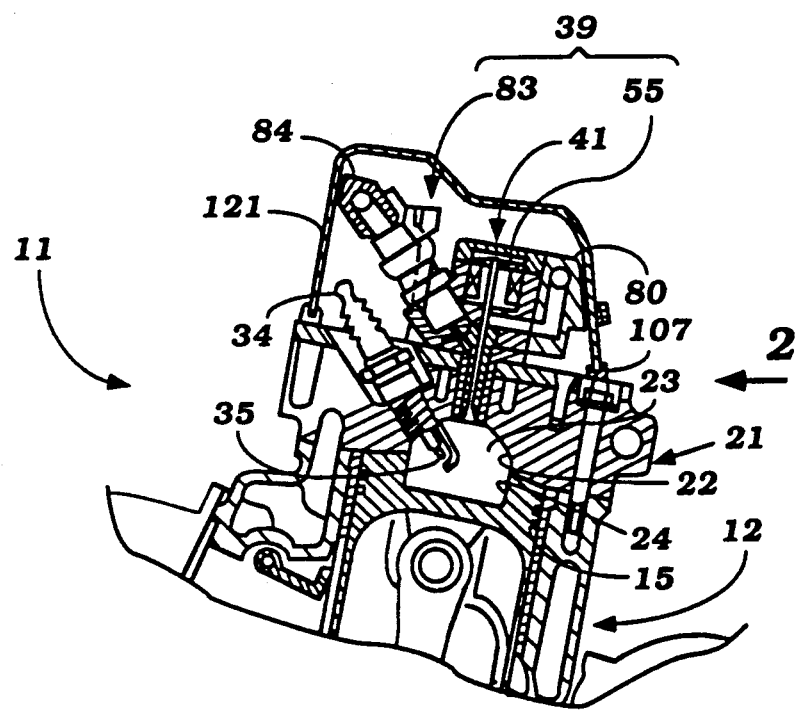
FIG. 7 is a partial cross-sectional view, in part similar to FIG. 1, and shows another embodiment of the invention.

The member 104 has side walls 105 that extend downwardly toward the cylinder head 21 and which terminate in edges 106 that receive a sealing gasket 107 that is compressably engaged with the cylinder head 21 for sealing purposes. The insulating cover 104 is held in place by threaded fasteners 108 which pass through openings in the side wall 105 and which are surrounded by elastomeric grommets 109 for sealing purposes. These fasteners 108 are secured in a side wall 111 of the manifold 80. In addition, further fasteners 112 are surrounded by elastomeric grommets 113 and engage the housing piece 43 of the injector housing assembly 41. As a result, there will be good sound insulation. One of the side walls 105 of the insulating housing 104 is formed with a plurality of aligned apertures 113 through which the fuel injectors 83 extend. Alternatively, the housing assembly 104 may be extended as shown at 121 in FIG. 7 so as to completely enclose the fuel injectors 83 and also the spark plugs 34.

In addition to providing sound insulation, air is passed through the interior of the insulating housing 104 in a manner to be described so as to provide cooling for the injectors 39 and specifically the solenoids 55 thereof. This air flow will insure against overheating of the air and fuel injected by the injectors 39.

Figure 6:
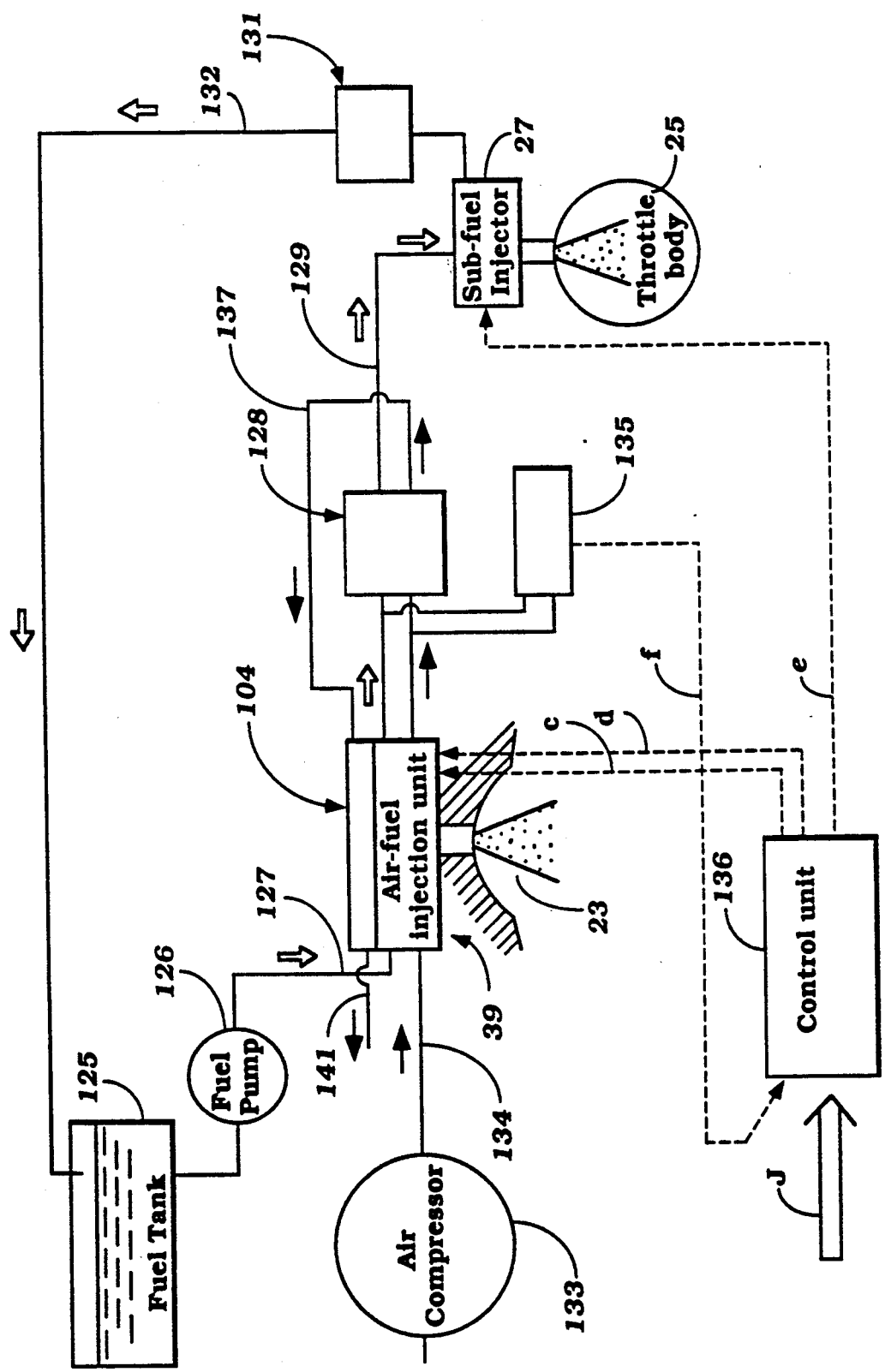
FIG. 6 is a schematic view showing the fuel air injection system and the controls therefor.

Referring now to FIG. 6, a schematic of the system is illustrated which will indicate how the air and fuel are supplied to the injectors 39 and also one embodiment of how the air flow path may be accomplished through the insulating housing 104.

The fuel system includes a fuel tank 125 from which fuel is drawn by a high pressure fuel pump 126 and which is delivered through a conduit 127 to the fuel manifold 84 and specifically the passage 87 thereof. At the other end of the fuel manifold 84, a line extends to a pressure regulating valve 128 that serves to regulate both fuel pressure and air pressure so as to provide a predetermined pressure differential therebetween. The fuel pressure is regulated by bypassing fuel to a further line 129 that supplies the subinjectors 27. A secondary pressure regulator 131 regulates the pressure of fuel delivered to the sub injectors 27 by bypassing excess fuel flow back to the tank 125 through a return line 132.

The air pressure system includes an air pressure compressor 133 that is driven from the engine 11 in a suitable manner and which outputs pressure to a line 134. The line 134 is connected to the air manifold 84 at one end of the passage 75. The opposite end of the passage communicates through a conduit with the regulator 128 so as to regulate the air pressure in relation to fuel pressure, as aforenoted. A pressure differential sensor 135 outputs a signal f to a control unit 136 which controls the air fuel injectors 39 and the sub injectors 27 in a manner to be described. The air pressure relieved by the valve 128 is passed back through a conduit 137 to a fitting 138 (FIGS. 4 and 5) formed at one end of the housing 104. An outlet fitting 139 at the opposite end of the insulating housing 104 is connected to a conduit 141 which, in turn, delivers the air to the exhaust system for the engine, preferably upstream of its catalytic converter (if one is employed).

Returning again to FIG. 6, the control unit 136 receives an input signal J determinative of the engine running conditions and output signals c to the fuel injectors 83 to actuate them, a signal d to the solenoid 55 for actuating the injector valve 51 and a signal e to the sub injectors 27 for actuating them. Any suitable control strategy may be employed, as is known in this art.

It should be readily apparent from the foregoing description that the described construction permits a very effective fuel air injection system, one which not only provides noise insulation, but also heat insulation. The air cooling is achieved by circulating the air from the air compressor through the insulating housing 84. One specific flow path has been illustrated, but it should be readily apparent to those skilled in the art that other flow paths may be employed. A wide variety of other changes and modifications may be made without departing from the spirit and scope of the invention, as defined by the appended claims.

We claim:

1. A fuel air injection unit for injecting fuel and air to an internal combustion engine comprising a housing assembly having an injector port, an injector valve supported for movement between an opened position and a closed position for controlling the flow through said injector port, an actuator for said injector valve for operating said injector valve, a fuel injector mounted in said housing assembly for injecting fuel thereto for discharge when said injector valve is in its opened position, an air inlet port in said housing for receiving compressed air for discharge from said injector port when said injector valve is open, an insulating housing at least in part enclosing said housing assembly, an air compressor for supplying air under pressure to said air inlet port of said injection unit, and means for circulating the air moved by said air compressor through said insulating housing for cooling.

2. A fuel air injection unit as set forth in claim 1 wherein the insulating housing encloses the actuator for the injector valve.

3. A fuel air injection unit as set forth in claim 2 wherein the insulating housing at least partially encloses the fuel injector.

4. A fuel air injection unit as set forth in claim 3 wherein the injection unit is mounted on a cylinder head of the associated engine and the insulating housing is sealingly engaged with the cylinder head.

5. A fuel air injection unit as set forth in claim 4 further including a spark plug mounted in the cylinder head and enclosed by the insulating housing, the fuel injector being completely enclosed by the insulating housing.

6. A fuel air injection unit as set forth in claim 1 further including pressure regulating means for regulating the air pressure delivered to the air inlet port, the relieved air pressure being circulated through the insulating housing.

7. A fuel air injection unit as set forth in claim 6 wherein the insulating housing encloses the actuator for the injector valve.

8. A fuel injection unit as set forth in claim 7 wherein the insulating housing at least partially encloses the fuel injector.

9. A fuel air injection unit as set forth in claim 8 wherein the injection unit is mounted on a cylinder head of the associated engine and the insulating housing is sealingly engaged with the cylinder head.

10. A fuel air injection unit as set forth in claim 9 further including a spark plug mounted in the cylinder head and enclosed by the insulating housing, the fuel injector being completely enclosed by the insulating housing.

11. A fuel air injection unit for injecting fuel and air to an internal combustion engine having a cylinder head, a spark plug mounted in said cylinder head, said fuel air injection unit comprising a housing assembly having an injector port mounted in said cylinder head, an injector valve supported for movement between an opened position and a closed position for controlling the flow through said injector port, an actuator for said injector valve for operating said injector valve, a fuel injector mounted in said housing assembly for injecting fuel thereto for discharge when said injector valve is in its opened position, an air inlet port in said housing for receiving compressed air for discharge from said injector port when said injector valve is open, and an insulating housing mounted on said cylinder head and sealingly engaged therewith and completely enclosing said fuel air injection unit and said spark plug.

12. A fuel air injection unit as set forth in claim 11 further including means for circulating air through the insulating housing for cooling.

13. A fuel air injection unit as set forth in claim 12 further including an air compressor for delivering air to the air inlet port of the housing assembly and wherein the air circulated through the insulating housing is moved by the air compressor.

14. A fuel air injection unit as set forth in claim 13 further including pressure regulating means for regulating the air pressure delivered to the air inlet port, the relieved air pressure being circulated through the insulating housing.

* * * * *